United States Patent [19]

Cwalinski

[11] Patent Number: 5,428,219
[45] Date of Patent: Jun. 27, 1995

[54] FIBER OPTIC INCLINATION DETECTOR SYSTEM HAVING A WEIGHTED SPHERE WITH REFERENCE POINTS

[75] Inventor: Jeffrey P. Cwalinski, Ballston Lake, N.Y.

[73] Assignee: United States of America as represened by the United States Department of Energy, Washington, D.C.

[21] Appl. No.: 223,566

[22] Filed: Apr. 6, 1994

[51] Int. Cl.$^6$ ............................................... H01J 5/16
[52] U.S. Cl. ............................ 250/227.21; 250/231.1; 33/366
[58] Field of Search ................. 250/227.21, 227.29, 250/229, 231.1, 231.12; 324/207.18, 207.16; 364/508, 571.01; 73/705–723, 575; 33/365, 366, 348.2; 340/689

[56] References Cited

U.S. PATENT DOCUMENTS

| | | | |
|---|---|---|---|
| 4,484,393 | 11/1984 | LaFreniere | 33/348.2 |
| 4,899,132 | 2/1990 | Stobbe et al. | 340/551 |
| 4,947,692 | 8/1990 | Koppel | 73/786 |
| 5,025,567 | 6/1991 | McWilliams et al. | 33/348.2 |
| 5,072,615 | 12/1991 | Nawrocki | 73/291 |
| 5,079,847 | 1/1992 | Swartz et al. | 33/366 |
| 5,140,559 | 8/1992 | Fisher | 367/149 |
| 5,148,018 | 9/1992 | Ammann | 250/231.1 |
| 5,202,559 | 4/1993 | Durst | 250/231.1 |
| 5,373,153 | 12/1994 | Cumberledge et al. | 250/231.1 |

Primary Examiner—David C. Nelms
Assistant Examiner—Que T. Le
Attorney, Agent, or Firm—William M. Imvalle; William R. Moser; Paul A. Gottlieb

[57] ABSTRACT

A fiber optic inclination detector system for determining the angular displacement of an object from a reference surface includes a simple mechanical transducer which requires a minimum number of parts and no electrical components. The system employs a single light beam which is split into two light beams and provided to the transducer. Each light beam is amplitude modulated upon reflecting off the transducer to detect inclination. The power values associated with each of the reflected light beams are converted by a pair of photodetectors into voltage signals, and a microprocessor manipulates the voltage signals to provide a measure of the angular displacement between the object and the reference surface.

15 Claims, 1 Drawing Sheet

FIBER OPTIC INCLINATION DETECTOR SYSTEM HAVING A WEIGHTED SPHERE WITH REFERENCE POINTS

RIGHTS OF THE GOVERNMENT

The Government has rights in this invention pursuant to Contract No. N00024-79-C-4027 awarded by the U. S. Department of Energy to the General Electric Company.

BACKGROUND OF THE INVENTION

1. Field of the Invention

The present invention relates generally to a system for determining the angular displacement of an object from a reference surface and, more particularly, to an improved system which is microprocessor controlled and utilizes a simple mechanical transducer in combination with fiber optic circuitry to determine such angular displacement.

2. Description of the Prior Art

Presently, systems for determining the angular displacement of an object from a reference surface are commercially available. One known system employs a transducer which is fixed to the object. The transducer is formed from a Linear Variable Differential Transformer (LVDT) and a spring and weight assembly. The gravitational force of the weight is exerted on the movable core of the LVDT and this gravitational force is opposed by a compression force exerted by the spring. When an angle of inclination exists between the object and the reference surface, the gravitational force of the weight changes. The gravitational force is determined by the formula, gravitational force $(F) = m \times g \times \cos X$, where m is the mass of the weight, g is the gravitational constant, and X is the angle of inclination measured from the vertical. Under this condition, the weight force F acting against the spring is reduced. As the weight force F is reduced the core of the LVDT moves, changing the magnetic coupling between the LVDT primary and secondary coils and causing the output voltage of the LVDT to change. This change in LVDT output voltage is detected and the magnitude of the change is converted into an electrical signal representative of the angular displacement between the object and the reference surface.

Although this well-known system which utilizes an LVDT/spring and weight assembly transducer is capable of determining the angular displacement between an object and a reference surface, it is not without problems. For example, since this transducer is formed from a relatively large number of mechanical parts, part wear and friction generated as mechanical parts move can cause an inaccurate angular measurement to be made. In addition, since this transducer also includes electrical components, electrical failures can also cause inaccurate angular measurements.

Consequently, a need exists for an improved system for determining the angular displacement between an object and a reference surface which utilizes a transducer of simple mechanical design to eliminate both the mechanical and electrical difficulties experienced by presently utilized systems which employ combined LVDT/spring and weight assembly transducers.

SUMMARY OF THE INVENTION

The present invention is directed to an inclination detector system designed to satisfy the aforementioned needs. The inclination detector system of the present invention employs a simple mechanical transducer for measuring the angular displacement of an object from a reference surface and a fiber optic system communicating with the transducer for determining the value of the measurement. This arrangement is substantially free of mechanical or electrical difficulties since complex mechanical transducer structures and electrical circuitry are not utilized. The inclination detector system of the present invention is microprocessor controlled to compensate for optical losses experienced as the fiber optic system ages to provide a reliable measurement of angular displacement over a long period of time.

Accordingly, the present invention is directed to a fiber optic inclination detector system for determining the angular displacement of an object from a reference surface. The fiber optic inclination detector system comprises: (a) a spherical housing having top and bottom openings therein and adapted to be placed on a surface of the object; (b) a weighted sphere positioned within the housing and arranged to move relative to the housing when the housing is placed on the surface of the object so that top and bottom reference points located on an outer surface of the sphere lie along a line perpendicular to the reference surface, the top reference point is angularly spaced from the top opening and the bottom reference point is angularly spaced from the bottom opening; (c) a light source for generating an optical signal; (d) fiber optic circuitry for transmitting an optical signal into each of the top and bottom openings in the housing and thereafter receiving a pair of top and bottom return optical signals each reflected off the surface of the sphere, the top return optical signal being proportional to the angular spacing between the top reference point and the top opening and the bottom return optical signal being proportional to the angular spacing between the bottom reference point and the bottom opening; (e) a first photodetector device for receiving the top return optical signal and converting the top return optical signal to a first voltage signal; (f) a second photodetector device for receiving the bottom return optical signal and converting the bottom return optical signal to a second voltage signal; and (g) a microprocessor for receiving the first and second voltage signals and generating a division product of the first and second voltage signals representative of the angular displacement of the object from the reference surface.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DETAILED DESCRIPTION OF THE INVENTION

Figure 1:
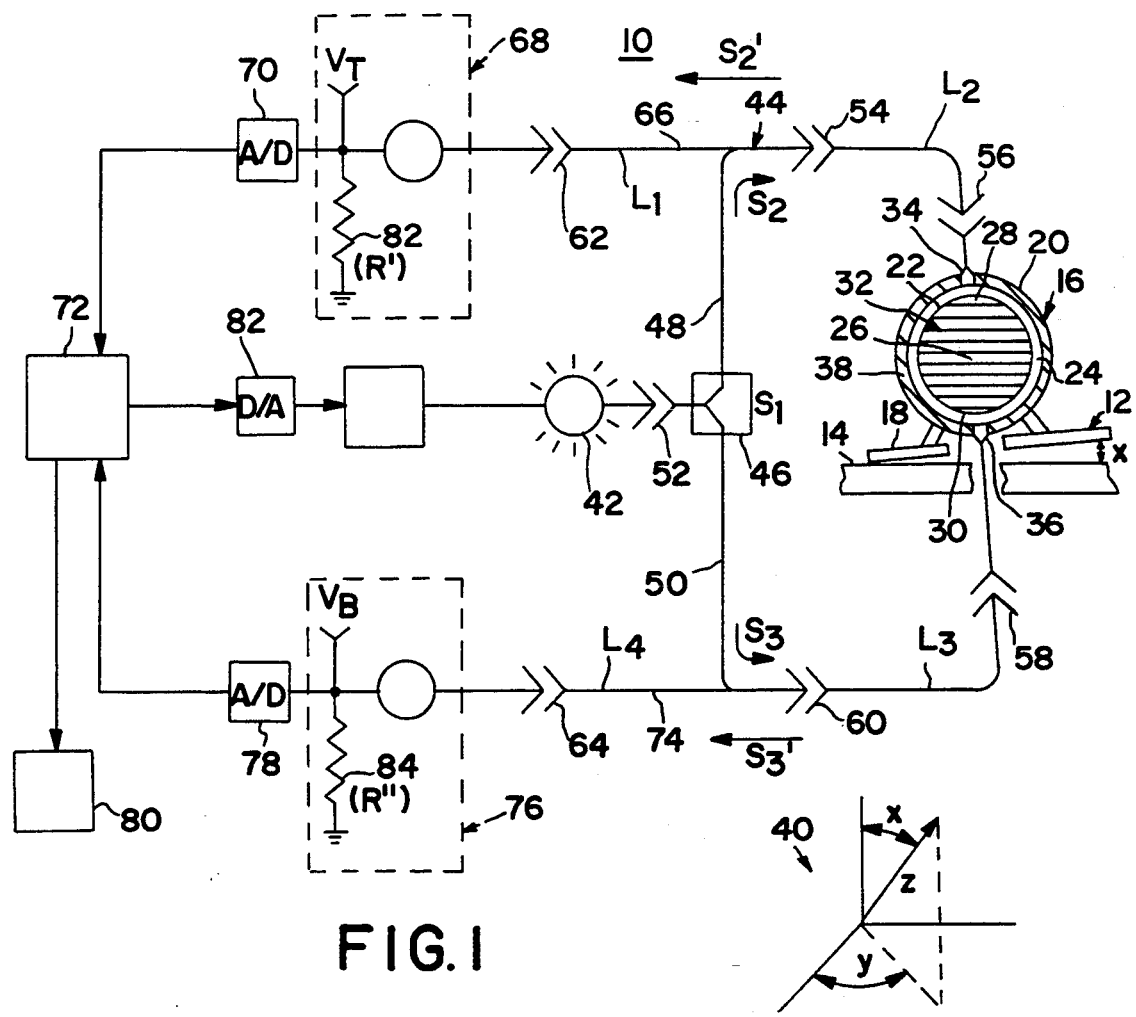
FIG. 1 is a schematic representation of the fiber optic inclination detector system of the present invention, illustrating a mechanical transducer positioned on an object angularly displaced from a reference surface, optical circuitry communicating with the transducer for determining the value of the angular displacement and a microprocessor communicating with the optical circuitry for converting the value of the angular measurement to a human-readable value.

In the following description, like reference characters designate like or corresponding parts throughout the several views. Also in the following description, it is to be understood that such terms as "forward", "rearward", "right", "left", "upwardly", "downwardly", "top", "bottom", and the like, are words of convenience and are not to be construed as limiting terms.

Referring now to the drawings, and particularly to FIG. 1, there is illustrated a fiber optic inclination detector system generally designated by the numeral 10 for determining the angular displacement of an object 12 from a reference surface 14. The angular displacement is represented by the angle x. The fiber optic inclination detector system 10 includes a transducer 16 which has a simple mechanical design requiring a minimum number of parts and no electrical components. The fiber optic inclination detector system 10 employs a single light beam which is split into two light beams. Each light beam is amplitude modulated to detect the angle of inclination. The detector system 10 also includes a microprocessor operable to compensate for reductions in optical light transmission due to aging of the optical components and provide as an output signal the value of the angular displacement x in human-readable form.

As seen in FIG. 1, the transducer 16 is positioned on a surface 18 of the object 12. The transducer 16 includes a spherical housing 20 shown in cross-section and fixed to the surface 18 of the object 12. The transducer 16 also includes a sphere 22 positioned within the interior 24 of the spherical housing 20. The sphere 22 is capable of rotating freely within the spherical housing 20 and has a center of gravity located below its geometric center 26. Since the sphere 22 is bottom weighted and movable within the housing 20, the top and bottom reference points 28, 30 of the sphere 22 remain essentially in their respective positions as shown in FIG. 1 for all values of the angle x. Assuming that the reference surface 14 is a level surface, the top and bottom reference points 28, 30 of the sphere 22 will remain along a line perpendicular to the reference surface 14 as the spherical housing 20 rotates relative to the sphere 22 upon placement of the housing 20 on the surface 18 of the object 12.

As further seen in FIG. 1, the spherical housing 20 includes top and bottom openings 34, 36 which extend through the wall 38 of the housing 20. The top and bottom openings 34, 36 are located in the housing 20 to remain along a line which is perpendicular to the surface 18 of the object 12 when the transducer 16 is placed on the surface 18. Since the top and bottom openings 34, 36 in the housing 20 lie along a line which remains perpendicular to the surface 18 and the top and bottom reference points 28, 30 of the sphere 22 lie along a line which remains perpendicular to the reference surface 14, the top opening 34 in the housing 20 is angularly spaced from the top reference point 28 of the sphere 22 and the bottom opening 36 of the housing 22 is angularly spaced from the bottom reference point 30 of the sphere 22 when the transducer 16 is placed on the surface 18. The angular spacing between the top opening 34 and the top reference point 28 is equal to the angular spacing between the bottom opening 36 and the bottom reference point 30 and is also equal to the angular displacement x. Thus, determining the angular spacing between the top opening 34 and the top reference point 28, which may also be designated by the angle x, will determine the angular displacement of the object 12 from the reference surface 14.

The value of the angle x may be determined as a function of the reflectivity of the sphere 22. The sphere 22 has an outer surface 32 which has a varying reflectivity. Preferably, the outer surface 32 of the sphere 22 is coated with a reflective material so that the top of the sphere 22 indicated by the top reference point 28 has a maximum reflectivity of ideally 100%. The reflectivity gradually decreases to 50% at the geometric center 26 of the sphere 22 and further decreases to a minimum of ideally 0% at the bottom of the sphere 22 indicated by the bottom reference point 30. In terms of spherical coordinates as illustrated in the coordinate diagram 40, the equation that describes the change from maximum reflectivity to minimum reflectivity (R) is:

$$R = 1 - x/180 \text{ degrees} \quad \text{(equation 1)}$$

The variable x, which is the quantity being measured, is in degrees and has a range of between $0 \leq x \leq 180$. The range for the remaining spherical coordinates are $0 \leq Y \leq 360$ and $z = r$, where r is the radius of the sphere 22.

For the condition when the top opening 34 in the housing 20 is aligned with the top reference point 28 of the sphere 22 (also referred to as T), 0 degrees will be the reference point for measurement of the angle x. Since the sphere 22 has an outer surface of varying reflectivity, the reflectivity will change from a maximum to a minimum as the value of the angle x increases. The equation for reflectivity at the point T is:

$$R_T = 1 - x/180 \quad \text{(equation 2)}$$

Under this same condition, the bottom opening 36 in the housing 20 is aligned with the bottom reference point 30 of the sphere 22 (also referred to as B), and x = 180 degrees will be the reference point for angular measurement. The reflectivity will change from a minimum to a maximum at this point as the value of x increases. As such, the equation for reflectivity at point B will be the complement of $R_T$. It is derived as follows:

$$R_B = 1 - R_T \quad \text{(equation 3)}$$

$$R_B = 1 - (1 - x/180) \quad \text{(equation 4)}$$

$$R_B = x/180 \quad \text{(equation 5)}$$

As the angular displacement between the object 12 and the reference surface 14 increases, the sphere 22 rotates within the housing 20 (i.e., the x coordinate changes) due to the weighted condition of the sphere 22, causing the amplitude of an optical signal passed through the top opening 34 in the housing 20 and reflected off the outer surface 32 of the sphere 22 ($R_T$) to decrease. This optical signal reflected off the outer surface 32 of the sphere 22 after entering the top opening 34 is referred to as the top return optical signal. At the same time, the amplitude of an optical signal passed through the bottom opening 36 in the housing and reflected from the outer surface 32 of the sphere 22 ($R_B$)

increases. This optical signal reflected off the outer surface 32 of the sphere 22 after entering the bottom opening 36 is referred to as the bottom return optical signal.

Optical signals are provided to the top and bottom openings 34, 36 of the housing 20 via a light source 42 and fiber optic circuit generally designated by the numeral 44. The light source 42, which may be a light-emitting diode or other suitable device, generates an optical signal which is passed first through a conventional light splitter 46. As known in the art, the light splitter 46 splits the optical signal so that one-half of the optical signal is provided to a first fiber optic transmission circuit 48 connected with the top opening 34 in the housing 20. The remaining one-half of the optical signal is provided to a second fiber optic transmission circuit 50 connected with the bottom opening 36 in the housing 20.

Under ideal conditions where no losses are experienced by the individual optical fibers forming the first and second fiber optic transmission circuits 48, 50, the connectors 52 through 64 joining the individual optical fibers forming the circuits 48, 50 and the optical light splitter 46, the amount of optical power incident on point T ($A_T$) and the amount of optical power incident on point B ($A_B$) will be equal to one-half the optical power delivered by the optical source 42, or 0.5 $A_s$, since the optical power from the source 42 passes through the 50/50 splitter. As such:

$$A_T = A_B = 0.5 \times A_s \quad \text{(equation 6)}$$

The amount of optical power returned from point T ($P_T$) or from the point B ($P_B$) is equal to the product of the reflectivity and the amount of optical power incident on these points, or:

$$P_T = A_T \times R_T, \text{ and} \quad \text{(equation 7)}$$

$$P_B = A_B \times R_B \quad \text{(equation 8)}$$

The input/output relationship for the value of the angle x, or the angular displacement of the object 12 from the reference surface 14, in terms of reflectivity (R) and incident light (A) can be expressed as a ratio:

$$\text{Angular displacement} = P_B/P_T \quad \text{(equation 9)}$$
$$= (A_B \times R_B)/(A_T \times R_T) \quad \text{(equation 10)}$$

Using equations 2, 5 and 6, equation 10 reduces to:

$$\textit{Angular displacement} = x/(180-x) \quad \text{(equation 11)}$$

At 0 degrees angular displacement equation 11 yields 0. At 90 degrees angular displacement equation 11 yields 1. Between 0 degrees and 90 degrees equation 11 varies between 0 and 1 and can be linear by properly coating the outer surface 32 of the sphere 22 with the reflective material.

The angular displacement representative of the value of the angle x is determined as follows. The top return optical signal previously described and having a power value $P_T$ expressed by the equation 7 passes through a first fiber optic return circuit 66 and into a first photodetector 68. As is well known in the art, the first photodetector 68 is operable to convert the top return optical signal into an top analog electrical signal. The top analog electrical signal next passes through an analog to digital converter 70 wherein it is digitized. The top electrical signal in digital form is finally provided to a microprocessor 72 wherein it is stored. Likewise, the bottom return optical signal previously described and having a power value $P_B$ expressed by the equation 8 passes through a second fiber optic return circuit 74 and into a second photodetector 76 wherein it is converted into a bottom analog electrical signal. The bottom analog electrical signal next passes through an analog to digital converter 78 wherein it is digitized. The bottom electrical signal in digital form is finally provided to the microprocessor 72 wherein it is also stored. Within the microprocessor 72, the value of the angle x is determined by solving the equations 9 through 11. The value of the angle x representative of the angular displacement between the object 12 and the reference surface 14 is provided to a display device 80 which provides a visual indication of the value of the angle x.

In the ideal case described above, the sum of the power returned from top and bottom reference points T and B, or the sum of the power of the top and bottom return optical signals, is an indication of the total amount of optical power being reflected off the outer surface 32 of the sphere 22 and should remain constant if optical losses are ignored. To prove this, neglecting the losses, the amount of light received at the points T and B is $0.5 A_s$, and the sum of the optical powers (or sum of the signals that represent the optical powers) from the points T and B is:

$$0.5 \times A_s \times R_T \quad \text{(equation 12)}$$

$$+ 0.5 \times A_s \times R_B \quad \text{(equation 13)}$$

$$= A_s \times (R_T + R_B) \quad \text{(equation 14)}$$

Substituting equations 2 and 5 into equation 14 and simplifying the results gives $A_s \times 1 = A_s$. If losses are included then the reflected power will be less than the power provided by the light source 42.

During the initial installation of the fiber optic inclination detector system 10 the number that represents the returned power as given by the equation 14 may be stored in the memory of the microprocessor 72. Periodically throughout operation the returned power could be calculated by the microprocessor 72 and compared to the value stored in memory, or some other value which represents a threshold value below which the returned optical power is judged to be insufficient for detection. At a preselected point below the threshold value, the microprocessor 72 will provide as an output a digital electrical signal which is converted to an analog electrical signal by digital-to-analog converter 82. The analog electrical signal next passes though a biasing circuit 84 to either increase the electrical current provided to the light source 42 or to activate one or more additional light sources.

By virtue of the fact that the angular inclination can be expressed as a ratio of two optical or electrical signals, any common mode attenuation cancels out. The differential mode attenuation could be detected as follows. The sphere is coated with a reflective material such that the percentage of light reflected ($R_T \times A_T$) is equal to the complement of the percentage of the light absorbed ($R_B \times A_B$), or:

$$R_B \times A_B = 1 - R_T \times A_T \quad \text{(equation 15)}$$

Let the subscript i stand for a initial value and the subscript f stand for a final value. A change in quantity is equal to the difference between the initial and final values.

$$R_{Bf} \times A_{Bf} = 1 - R_{Tf} \times A_{Tf} \quad \text{(equation 16)}$$
$$-(R_{Bi} \times A_{Bi} = 1 - R_{Ti} \times A_{Ti}) \quad \text{(equation 17)}$$

The difference is expressed by equation 18 below:

$$R_{Bf} \times A_{Bf} - R_{Bi} \times A_{Bi} = R_{Ti} \times A_{Ti} - R_{Tf} \times A_{Tf}$$

Equation 18 can be rewritten as:

$$|\text{delta } (R_B \times A_B)|/|\text{delta } (R_T \times A_T)| = 1 \quad \text{(equation 18)}$$

Throughout operation equation 18 can be calculated by the microprocessor 72. If the result increases in value then the losses in the first fiber optic transmission circuit 48 and the first fiber optic return circuit 66 have increased relative to the losses in the second fiber optic transmission circuit 50 and the second fiber optic return circuit 74. If the result decreases in value then the opposite is true regarding these optical losses. Compensation can be performed by the microprocessor 72.

Equations 10, 14 and 18 represent the input/output relationships for the angular displacement, total power returned and differential mode attenuation, respectively, in terms if the angle x and equations 2 and 5. These input/output relationships can be derived for the non-ideal case where optical losses are included and the optical power outputs $P_T$ and $P_B$ are converted by the first and second photodetectors 68 and 76 to voltages $V_T$ and $V_B$. These voltages are measured across the load resistors 82 and 84 of the first and second photodetectors 68 and 76, respectively. Assuming that the references $C_1$ through $C_7$ represent the optical losses associated with the fiber optic connectors 52 through 64, respectively, the references $S_1$ through $S_3$ represent the optical losses associated with the light splitter 46 for an optical signal transmitted to the transducer 16, the references $S_2'$ and $S_3'$ represent the optical losses associated with the light splitter 46 for an optical signal received from the transducer 16 and the references $L_1$ through $L_4$ represent the optical losses associated with the optical fiber, then the transfer function that relates optical input at the photodetector 68 to voltage output at the photodetector 68, including losses, for the optical circuits 48 and 66 for the optical path connected to the top opening 34 in the housing 20 is:

$$V_T = A_S \times (C_7 \times 0.5 \times L_7 \times S_1 \times L_6 \times \quad \text{(equation 19)}$$
$$S_2 \times C_2 \times L_2 \times C_5) \times R_T \times$$
$$(C_5 \times L_2 \times C_2 \times S_2' \times C_1 \times L_1 \times$$
$$D_1) \times R'$$

If $L_{Tf}$ represents the first parenthetical and $L_{TR}$ represents the second parenthetical, then:

$$V_T = A_S \times L_{Tf} \times R_T \times L_{TR} \quad \text{(equation 20)}$$

Let $A_T = (A_s \times L_{TF})$ and $A_T' = (A_T \times L_{TR})$, then $$V_T = A_T' \times R_T, \text{ in volts.} \quad \text{(equation 21)}$$

The transfer function that relates optical input at the photodetector 76 to voltage output at the photodetector 76, including losses, for the optical circuits 50 and 74 for the optical path connected to the bottom opening 36 in the housing 20 is:

$$V_B = A_S \times (C_7 \times 0.5 \cdot x L_7 \times S_1 \times L_5 \times \quad \text{(equation 22)}$$
$$S_3 \times C_4 \times L_3 \times C_6) \times R_B \times (C_6 \times$$
$$L_3 \times C_4 \times S_3' \times L_4 \times C_3 \times D_2) \times R'$$

If $L_{BF}$ represents the first parenthetical and $L_{BR}$ represents the second parenthetical, then:

$$V_B = A_S \times L_{BF} \times R_B \times L_{BR} \quad \text{(equation 23)}$$

Let $A_B = (A_S \times L_{BF})$ and $A_B' = (A_B \times L_{BR})$, then $$V_B = A_B' \times R_B, \text{ in volts.} \quad \text{(equation 24)}$$

Input/output relationships for angular displacement (equation 10), total optical power returned (equation 14) and differential mode attenuation (equation 18) can now be written in terms of $V_T$ and $V_B$. For these derivations the amplitudes of light incident on points T and B which have been obtained for the ideal case, namely $A_T$ and $A_B$, respectively, are replaced with those amplitudes obtained for the non-ideal case, namely $A_T'$ and $A_B'$. Thus, angular displacement, or the value of the angle x, is:

$$(R_B \times A_B')/(R_T \times A_T') \quad \text{(equation 25)}$$

Substituting equations 21 and 24 into equation 25, the angular displacement, or the value of the angle x, is equal to $V_B/V_T$. Using similar substitutions, the total power returned is $V_T + V_B$. The voltage outputs from the photodetectors 68 and 76 are converted to digital information by the analog-to-digital converters 70, 78, respectively, for use by the microprocessor 72 in calculating the angular displacement, or the value of the angle x, and performing compensation for the differential mode and common mode optical losses. As previously described, the microprocessor 72 also controls current to the light source 42 and drives the digital display 80.

Figure 2:
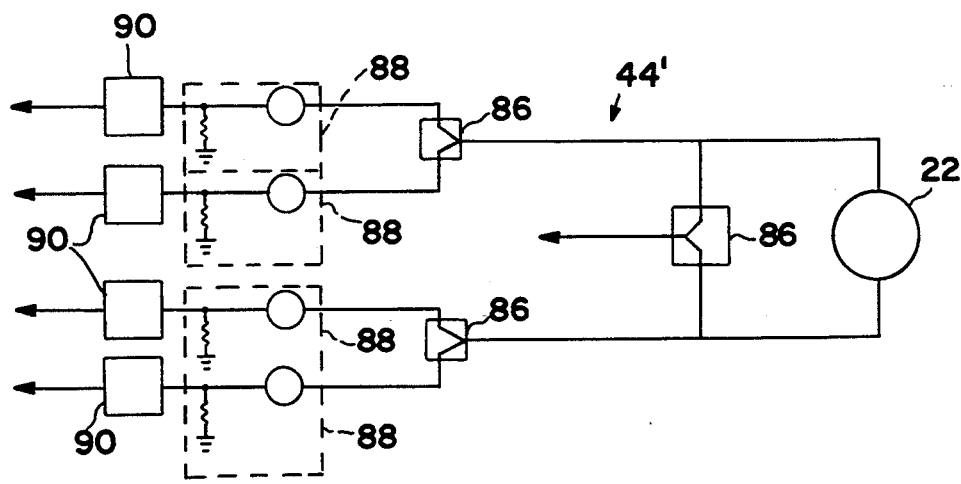
FIG. 2 is a schematic representation of an alternate embodiment of the optical circuitry of the inclination detector system of the present invention communicating with the mechanical transducer more fully illustrated in FIG. 1.

Now referring to FIG. 2, there is illustrated an alternate method for compensating for optical losses in the fiber optic circuit 44 and associated equipment as previously described with respect to FIG. 1. The alternate method utilizes a dual wavelength light source and the sphere 22 is coated so that the reflectivity of the sphere 22 varies for one wavelength as previously described. For the other wavelength, 100% of the light is reflected under all conditions of inclination. This other wavelength would be use to monitor optical losses. Beam splitter/filter combinations 86 could be used to separate the two optical signals. Photodetectors 88 could convert the optical signals to analog electrical signals, and analog-to-digital converters 90 could convert the analog signals to digital signals for processing.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

I claim:

1. A fiber optic inclination detector system for determining the angular displacement of an object from a reference surface, comprising:
   (a) a spherical housing having top and bottom openings therein and adapted to be placed on a surface of an object;
   (b) a weighted sphere positioned within said housing and arranged to move relative thereto when said housing is placed on said surface of said object so that top and bottom reference points located on an outer surface of said sphere lie along a line perpendicular to said reference surface, said top reference point being angularly spaced from said top opening and said bottom reference point being angularly spaced from said bottom opening;
   (c) a light source for generating an optical signal;
   (d) fiber optic means for transmitting an optical signal into each of said top and bottom openings in said housing and thereafter receiving a pair of top and bottom return optical signals each reflected off said surface of said sphere, said top return optical signal being proportional to the angular spacing between said top reference point and said top opening and said bottom return optical signal being proportional to the angular spacing between said bottom reference point and said bottom opening;
   (e) first photodetector means for receiving said top return optical signal and converting said top return optical signal to a first voltage signal;
   (f) second photodetector means for receiving said bottom return optical signal and converting said bottom return optical signal to a second voltage signal; and
   (e) processor means for receiving said first and second voltage signals and generating a division product of said first and second voltage signals representative of the angular displacement.

2. The fiber optic inclination detector system as recited in claim 1, wherein said top and bottom openings in said spherical housing are positioned to lie along a line perpendicular to said surface of said object.

3. The fiber optic inclination detector system as recited in claim 2, wherein said weighted sphere has a center of gravity located below its center and the outer surface of said sphere has a varying reflectivity.

4. The fiber optic inclination detector system as recited in claim 3, wherein said outer surface of said sphere is coated with a reflective material so that its reflectivity varies in substantially linear fashion from a maximum of 100 percent at the top of said sphere to a minimum of 0 percent at the bottom of said sphere.

5. The fiber optic inclination detector system as recited in claim 4, wherein said top return optical signal is a product of the power of said optical signal transmitted into said top opening in said housing and the reflectivity of said sphere at the location where said optical signal passing through said top opening is reflected off said surface of said sphere.

6. The fiber optic inclination detector system as recited in claim 4, wherein said bottom return optical signal is a product of the power of said optical signal transmitted into said bottom opening in said housing and the reflectivity of said sphere at the location where said optical signal passing through said bottom opening is reflected off said surface of said sphere.

7. The fiber optic inclination detector system as recited in claim 1, wherein said light source is at least one light-emitting diode.

8. The fiber optic inclination detector system as recited in claim 1, which includes:
   a splitter device positioned downstream from said light source for receiving an optical signal generated by said light source and splitting said optical signal into first and second optical signals each having one-half the power of said optical signal generated by said light source; and
   said fiber optic means includes a first fiber optic transmission circuit through which said first optical signal is transmitted to said top opening in said housing and a second fiber optic transmission circuit through which said second optical signal is transmitted to said bottom opening in said housing.

9. The fiber optic inclination detector system as recited in claim 8, wherein said splitter device is a 50/50 splitter.

10. The fiber optic inclination detector system as recited in claim 8, wherein said fiber optic means further includes a first fiber optic return circuit through which said top return optical signal is transmitted to said first photodetector means and a second fiber optic return circuit through which said bottom return optical signal is transmitted to said second photodetector means.

11. The fiber optic inclination detector system as recited in claim 1, wherein said processor means is a microprocessor operable to divide said bottom return optical signal by said top return optical signal to generate a number representative of the angular displacement of said object from said reference surface.

12. The fiber optic inclination detector system as recited in claim 11, wherein each of said top and bottom return optical signals is passed through an analog-to-digital converter device prior to being received by said microprocessor.

13. The fiber optic inclination detector system as recited in claim 11, which includes a display device connected to said microprocessor for providing a human-readable display of the angular displacement of said object from said reference surface.

14. The fiber optic inclination detector system as recited in claim 1, wherein said processor means provides as an output an electrical signal to said light source to cause said light source to generate said optical signal.

15. The fiber optic inclination detector system as recited in claim 13, which includes a digital-to-analog converter device electrically disposed between said processor means and said light source for converting a digital output signal generated by said processor means to an analog signal usable by said light source to generate said optical signal.

* * * * *